(12) United States Patent
Yang

(10) Patent No.: US 10,042,204 B2
(45) Date of Patent: Aug. 7, 2018

(54) DISPLAY APPARATUS, AND METHOD OF CONTROLLING THE SAME

(71) Applicant: SAMSUNG ELECTRONICS CO., LTD., Suwon-si (KR)

(72) Inventor: Joon Hyun Yang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/860,206

(22) Filed: Sep. 21, 2015

(65) Prior Publication Data

US 2016/0189602 A1 Jun. 30, 2016

(30) Foreign Application Priority Data

Dec. 29, 2014 (KR) .................. 10-2014-0191782
Jun. 2, 2015 (KR) .................. 10-2015-0077965

(51) Int. Cl.
*G09G 3/32* (2016.01)
*G02F 1/1335* (2006.01)
*G09G 3/3258* (2016.01)
*G09G 3/34* (2006.01)
*H05B 33/08* (2006.01)
*G09G 3/20* (2006.01)

(52) U.S. Cl.
CPC ..... *G02F 1/133603* (2013.01); *G09G 3/3258* (2013.01); *G09G 3/3426* (2013.01); *H05B 33/086* (2013.01); *G02F 2001/133612* (2013.01); *G09G 3/2003* (2013.01); *G09G 2330/021* (2013.01)

(58) Field of Classification Search
None
See application file for complete search history.

(56) References Cited

U.S. PATENT DOCUMENTS

2013/0147393 A1* 6/2013 Bazzani ............. H05B 33/0851
315/307
2014/0354698 A1* 12/2014 Lee ..................... G09G 3/3258
345/690

FOREIGN PATENT DOCUMENTS

| CN | 102254525 A | 11/2011 |
|---|---|---|
| EP | 1501069 A1 | 1/2005 |
| JP | 2001-119250 A | 4/2001 |

(Continued)

OTHER PUBLICATIONS

Communication dated May 17, 2016, issued by the European Patent Office in counterpart European Application No. 15197851.7.

(Continued)

*Primary Examiner* — Joseph Haley
(74) *Attorney, Agent, or Firm* — Sughrue Mion, PLLC

(57) ABSTRACT

A display apparatus is provided in which different driving voltages are supplied to each of a plurality of light emitting diodes (LEDs) by changing ground potentials of the plurality of LEDs included in an LED component, and a method of controlling the same.

The display apparatus includes an LED component including a first LED having a first driving voltage and a second LED having a second driving voltage less than the first driving voltage, a common anode node which connects an anode of the first LED to an anode of the second LED, and a power controller which supplies different driving voltages to the first LED and the second LED through the common anode node.

19 Claims, 13 Drawing Sheets

(56) References Cited

FOREIGN PATENT DOCUMENTS

WO            0051103 A1     8/2000

OTHER PUBLICATIONS

Communication dated Oct. 25, 2017, issued by the State Intellectual Property Office of P.R. China in counterpart Chinese Application No. 201510994090.5.
Communication dated May 17, 2018 by the State Intellectual Property Office of P.R. China in counterpart Chinese Patent Application No. 201510994090.5.

* cited by examiner

DISPLAY APPARATUS, AND METHOD OF CONTROLLING THE SAME

CROSS-REFERENCE TO RELATED APPLICATION(S)

This application claims priority from Korean Patent Application Nos. 10-2015-0077965 and 10-2014-0191782, filed on Jun. 2, 2015 and Dec. 29, 2014, respectively, in the Korean Intellectual Property Office, the disclosures of which are incorporated herein by reference in their entireties.

BACKGROUND

1. Field

Apparatuses and methods consistent with exemplary embodiments relate to a display apparatus in which light emitting diode (LED) modules including a plurality of LEDs are arranged, and a method of controlling the same.

2. Description of the Related Art

Display apparatuses are used to display broadcasting signals, or image signals/image data of various formats, and may include display panels for displaying images using light. For example, the display panels may be classified as self-emissive display panels that emit light by themselves or non-self-emissive display panels that do not emit light by themselves.

The light emitting diode (LED) panel is an example of a self-emissive display panel. The LED panel may be provided such that a plurality of LED modules are arranged in a predetermined direction. Because each of the plurality of LED modules corresponds to each pixel of the image to be displayed, each of the plurality of LED modules may emit light so as to realize the color of the corresponding pixel.

The light emitted by the plurality of LED modules may include visible light, and the plurality of LED modules may be provided so as to include a plurality of LEDs that emit light of different wavelengths.

SUMMARY

Therefore, it is an aspect of the one or more exemplary embodiments to provide a display apparatus in which different driving voltages are supplied to each of a plurality of light emitting diodes (LEDs) by changing ground potentials of the plurality of LEDs included in an LED module, and a method of controlling the same.

According to an aspect of an exemplary embodiment, there is provided a display apparatus including a light-emitting diode (LED) component including a first LED having a first driving voltage and a second LED having a second driving voltage that is less than the first driving voltage, a common anode node which connects an anode of the first LED to an anode of the second LED, and a power controller which supplies different driving voltages to the first LED and the second LED through the common anode node.

The power controller may be configured to apply the first driving voltage to the common anode node and a cathode of the first LED, and apply the second driving voltage to the common anode node and a cathode of the second LED.

The power controller may be configured to apply a common positive potential to the common anode node.

The power controller may be configured to apply a first ground potential, which is determined according to a difference between an amount of the common positive potential and an amount of the first driving voltage to the cathode of the first LED, and apply a second ground potential which is determined according to a difference between an amount of the common positive potential and an amount of the second driving voltage to the cathode of the second LED.

The power controller may be configured to apply a potential to the cathode of the second LED that is greater than the potential of the cathode of the first LED.

The power controller may be configured to determine a driving voltage of the second LED based on a change of a current applied to the second LED according to a change of an output voltage.

The power controller may be configured to, in response to a voltage being applied to the second LED being reduced from the first driving voltage of the first LED, determine the change of the current applied to the second LED to determine the driving voltage of the second LED.

The power controller may be configured to, in response to the current being applied to the second LED being reduced, determine the voltage applied to the second LED as the driving voltage of the second LED.

The power controller may be configured to divide a current supplied from a power source, and output the first driving voltage and the second driving voltage based on the divided current.

The power controller may be configured to output the first driving voltage based on a current supplied from the power source, and output the second driving voltage based on the output first driving voltage.

The power controller may include a switch which controls a flow of an input current supplied from the power source so as to output the driving voltage supplied to the LED component.

According to an aspect of another exemplary embodiment, there is provided a method of controlling a display apparatus in which an LED component includes a first LED having a first driving voltage and a second LED having a second driving voltage that is less than the first driving voltage, including applying a common positive potential to a common anode node which connects an anode of the first LED to an anode of the second LED, applying a first ground potential to a cathode of the first LED so that the first driving voltage is applied to the first LED, and applying a second ground potential to a cathode of the second LED so that the second driving voltage is applied to the second LED.

The applying the first ground potential may include determining the first ground potential according to a difference between an amount of the common positive potential and an amount of the first driving voltage, and the applying of the second ground potential may include determining the second ground potential according to a difference between the size of the common positive potential and a size of the second driving voltage.

The applying the second ground potential may include applying the second ground potential that is greater than the first ground potential.

The method may further include changing a voltage applied to the second LED and determining the second driving voltage.

The determining the second driving voltage may include changing the voltage applied to the second LED, determining a current which flows in the second LED according to the supplied voltage which is changed, and determining the second driving voltage based on the determined current.

The changing the voltage applied to the second LED may include reducing the voltage applied to the second LED from the first driving voltage.

The determining the second driving voltage based on the determined current may include determining the voltage at a time at which the current applied to the second LED is reduced as a driving voltage of the second LED.

According to an aspect of another exemplary embodiment, there is provided a method of controlling a display apparatus, the method including: displaying an image by providing a plurality of voltages to a light-emitting diode (LED) component, wherein the LED component comprises a first LED and a second LED; applying a first potential to a common anode node of the first LED and the second LED, and applying a first ground potential to the cathode of the first LED and applying a second ground potential to the cathode of the second LED, such that a voltage across the second LED is less than a voltage across the first LED.

The applying the first potential may include rectifying an alternating current (AC) voltage externally input to a direct current (DC) voltage.

The applying the first potential may include applying a driving current to the common anode node based on a power supplied by a power source.

The method may include a first power controller and a second power controller for supplying the first ground potential and the second ground potential, respectively.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EXEMPLARY EMBODIMENTS

Below, a display apparatus and a method of controlling the same will be described in detail with reference to the accompanying drawings. The present disclosure may be variously changed and may have various exemplary embodiments. It should be understood that the present disclosure is not limited to these exemplary embodiments, but the present disclosure includes all modifications, equivalents, and alternatives within the spirit and the scope of the present disclosure.

Although the terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items. Expressions such as "at least one of," when preceding a list of elements, modify the entire list of elements and do not modify the individual elements of the list.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined.

Furthermore, in the description of exemplary embodiments, a "module" or a "unit" may perform at least one function or operation and may be embodied as hardware or software or as a combination of hardware and software. Also, a plurality of "modules" or a plurality of "units" may be integrated into at least one module except a "module" or a "unit" that may be embodied as particular hardware, to be embodied as at least one processor.

Figure 1A:
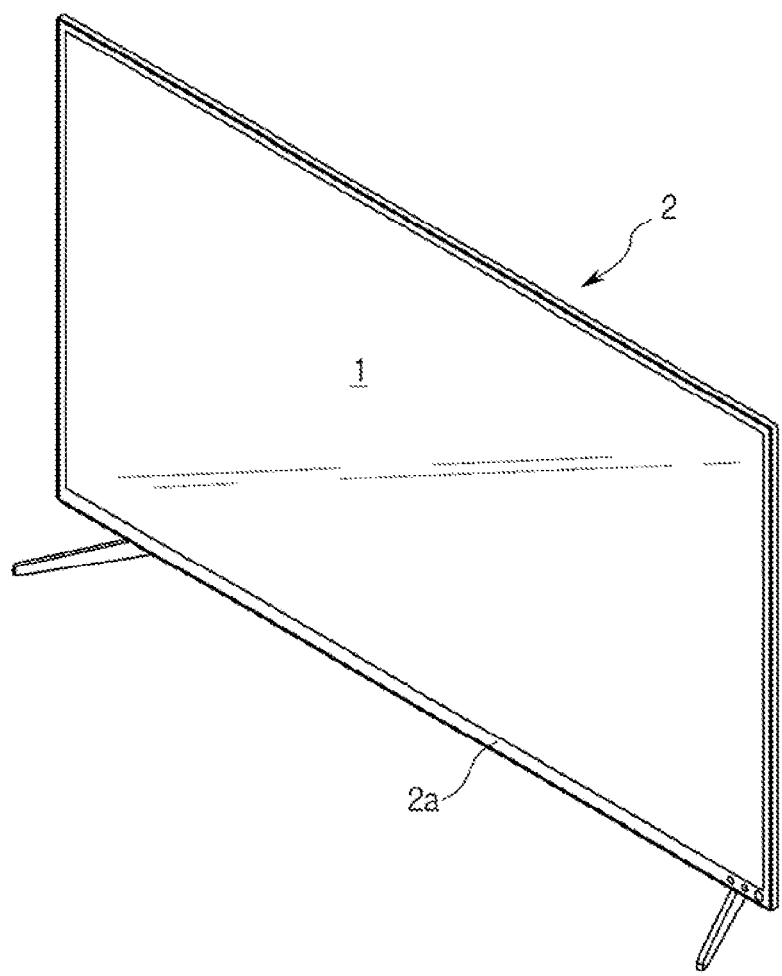
FIGS. 1A and 1B are views illustrating one or more display apparatuses according to an exemplary embodiment.
Figure 1B:
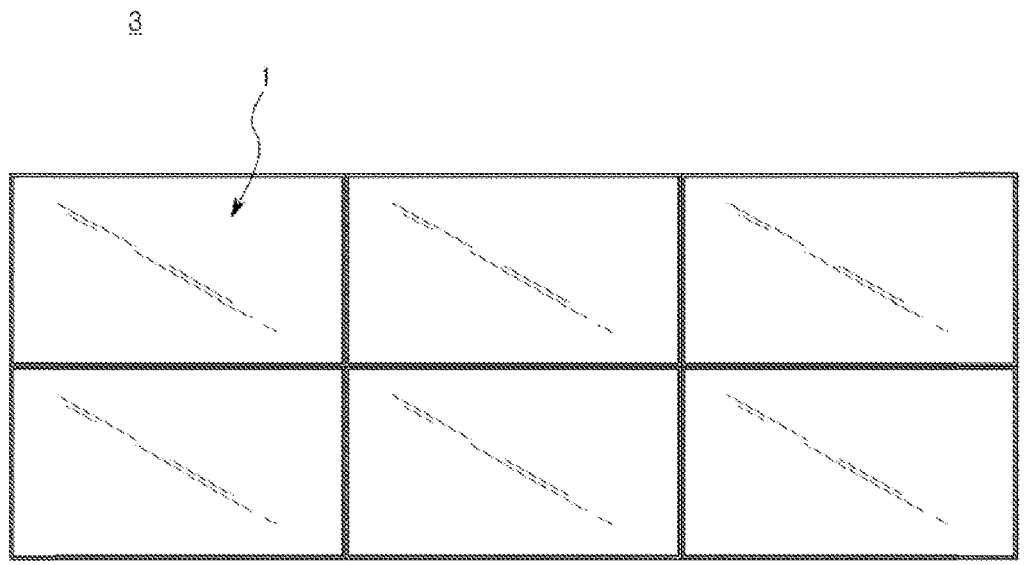

FIGS. 1A and 1B are views illustrating display apparatuses according to one or more exemplary embodiments.

The display apparatus 2 may refer to a device that displays images received from the outside, or images generated within the device, so that a user may visually recognize the images.

As shown in FIG. 1A, the display apparatus 2 may include a display panel 1 for displaying the images and a bezel 2a provided to protect a periphery of the display panel 1.

The display panel 1 is implemented with a plurality of pixels, and each of the plurality of pixels may emit light in the visible spectrum. The light emitted from the plurality of pixels is transmitted to the eyes of the user and thus the user may recognize the images through the display panel 1.

The bezel 2a may be used to fix a position of the display panel 1, to help to ensure that the images are stably provided to the user, and to serve to prevent the display panel 1 from being damaged from the outside.

For example, the bezel 2a may be implemented with a durable metal or a synthetic resin.

A case in which the display apparatus 2 includes one display panel 1 is illustrated in FIG. 1A. According to an exemplary embodiment, the display apparatus 2 including one display panel 1 may include a television.

According to an exemplary embodiment, a display apparatus 3 may include a plurality of display panels 1. As illustrated in FIG. 1B, the display apparatus 3 may have a plurality of the display apparatuses 2 adjacently installed.

When the plurality of display panels 1 are connected as shown in FIG. 1B, a larger image may be provided to the user. Thus, the display apparatus 3 of FIG. 1B may be used to provide a plurality of users with the images through a large screen.

According to an exemplary embodiment, the display apparatus 3 including the plurality of display panels 1 may include a large format display (LFD) and signage.

The display panels 1 of FIGS. 1A and 1B may be implemented as an LED panel 200 in which a plurality of LED modules 210 are arranged. Below, a display apparatus 2 including the LED panel 200 will be described.

Figure 2:
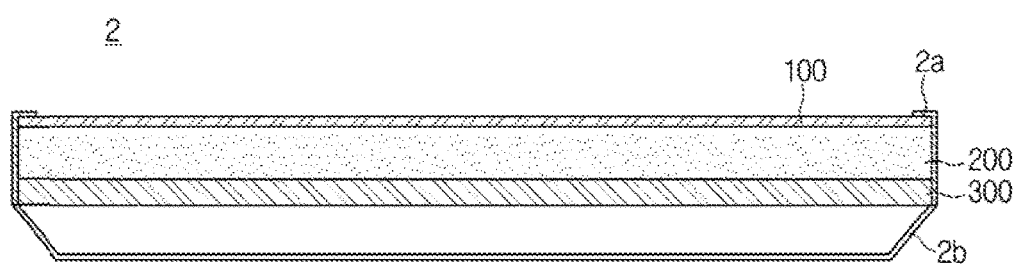
FIG. 2 is a cross-sectional view of a display apparatus according to an exemplary embodiment.
Figure 3A:
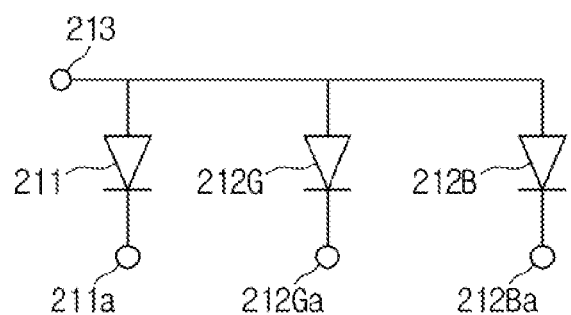
FIGS. 3A and 3B are circuit diagrams of light emitting diode (LED) modules according to one or more exemplary embodiments.
Figure 3B:
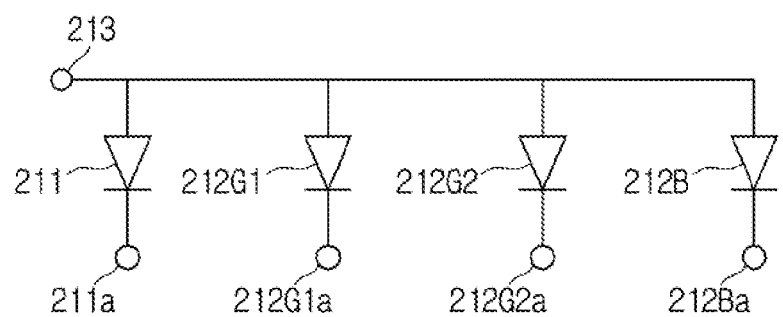

FIG. 2 is a cross-sectional view of a display apparatus 2 according to an exemplary embodiment, and FIGS. 3A and 3B are circuit diagrams of LED modules 210 (e.g., LED components) according to one or more exemplary embodiments.

Referring to FIG. 2, the display apparatus 2 may include a display panel 200 which is supplied with power to display an image, a driving circuit 300, which is provided on a back surface of the display panel 200 and controls a current supplied to the display panel 200, and a transparent panel 100, which is provided on a front surface of the display panel 200 and protects the display panel 200 from the outside.

The transparent panel 100 may be installed on the front surface of the display panel 200 and thus may protect the front surface of the display panel 200 from the outside. The transparent panel 100 may be implemented with an excellent durable material. Further, if the transparent panel 100 is provided on the front surface of the display panel 200, the transparent panel 100 may be provided so as to transmit light emitted from the front surface of the display panel 200.

The driving circuit 300 may control electrical signals that flow into the display panel 200. For example, the driving circuit 300 may transmit image signals including image information to be displayed to the display panel 200, the display panel 200 may emit light according to the transmitted image signals, and thus the user may visually recognize images.

Although a case in which the driving circuit 300 is installed on the back surface of the display panel 200 is illustrated in FIG. 2, the driving circuit 300 may be freely installed so that a path of light generated in the display panel 1 is not disrupted.

A bezel 2a may be installed on outer sides of the transparent panel 100, the display panel 200, and the driving circuit 300, and thus may fix positions thereof. Further, a chassis 2b may be installed on a back surface of the driving circuit 300 and be connected to the bezel 2a. Therefore, the transparent panel 100, the display panel 200, and the driving circuit 300 may be located in an internal space formed by the chassis 2b.

When the image signals, which are electrical signals, are received, the display panel 200 may emit the light and then provide the images to the user. The display panel 200 may be classified as a light-receiving panel structure or a self-emissive panel structure according to a method of generating light. The display panel 200 having the light-receiving panel structure does not emit light by itself, and thus the display apparatus 100 should have a separate backlight unit which generates light and supplies light to the display panel 200. The display panel 200 having the self-emissive panel structure emits light by itself, and thus the display apparatus 100 requires no separate backlight unit. The display panel 200 described below has a self-emissive panel structure.

In order to display each pixel of the image, the display panel 200 may include a plurality of LED modules 210 which generate light by themselves. In this case, the plurality of LED modules 210 may be arranged in one or more predetermined directions. For example, the plurality of LED modules 210 may be arranged in a first direction and a second direction perpendicular to first direction. Therefore, the display panel 200 may display a two-dimensional image.

If the plurality of LED modules are arranged in two dimensions, the driving circuit 300 may provide separate image signals to each of the plurality of LED modules 210. The number of driving circuits 300 may correspond to the number of LED modules 210 arranged in the display panel 200. Each of the plurality of driving circuits 300 may transfer the separate image signal to the corresponding LED module 210 to control light generated by each of the plurality of LED modules 210.

According to an exemplary embodiment, the driving circuit 300 may control the plurality of LED modules 210 arranged in two dimensions in rows or columns. If the driving circuit 300 controls the plurality of LED modules 210 in columns, the LED modules 210 included in the same column may be sequentially activated with a time difference. This will be described below with reference to FIG. 4.

The plurality of LED modules 210 may generate light including visible light, and may provide the image through the plurality of pixels. The plurality of LED modules 210 may include red LEDs 211, green LEDs 212G, and blue LEDs 212B.

Referring to FIG. 3A, the LED module 210 may include the red LED 211, the green LED 212G, and the blue LED 212B, and may further include a common anode node 213 which connects anodes of the LEDs into which a current flows.

Such an LED module 210 is referred to as a common anode type.

In addition, the LED module 210 may be provided with a plurality of green LEDs 212G. Referring to FIG. 3B, an example in which the LED module 210 including two green LEDs 212G1 and 212G2 is illustrated. In this example, the LED module 210 may include the common anode node 213 which connects the anodes of the red LED 211, the plurality of green LEDs 212G1 and 212G2, and the blue LED 212B.

As described above, since the LED module 210 may generate a red color, a green color, a blue color, or a combination thereof, the LED module 210 may visually implement each pixel of the image.

The red LED 211 has a driving voltage different from the green LED 212G or the blue LED 212B. For example, the red LED 211 may emit light when a voltage of about 2.0 V is applied, the green LED 212G or the blue LED 212B may emit light when a voltage of about 3.5 V is applied. In this example, different voltages are applied separately to the red LED 211 and other LEDs 212G and 212B.

Below, a display apparatus 2 that supplies different driving voltages by changing the grounds of LEDs having different driving voltages will be described.

Figure 4:
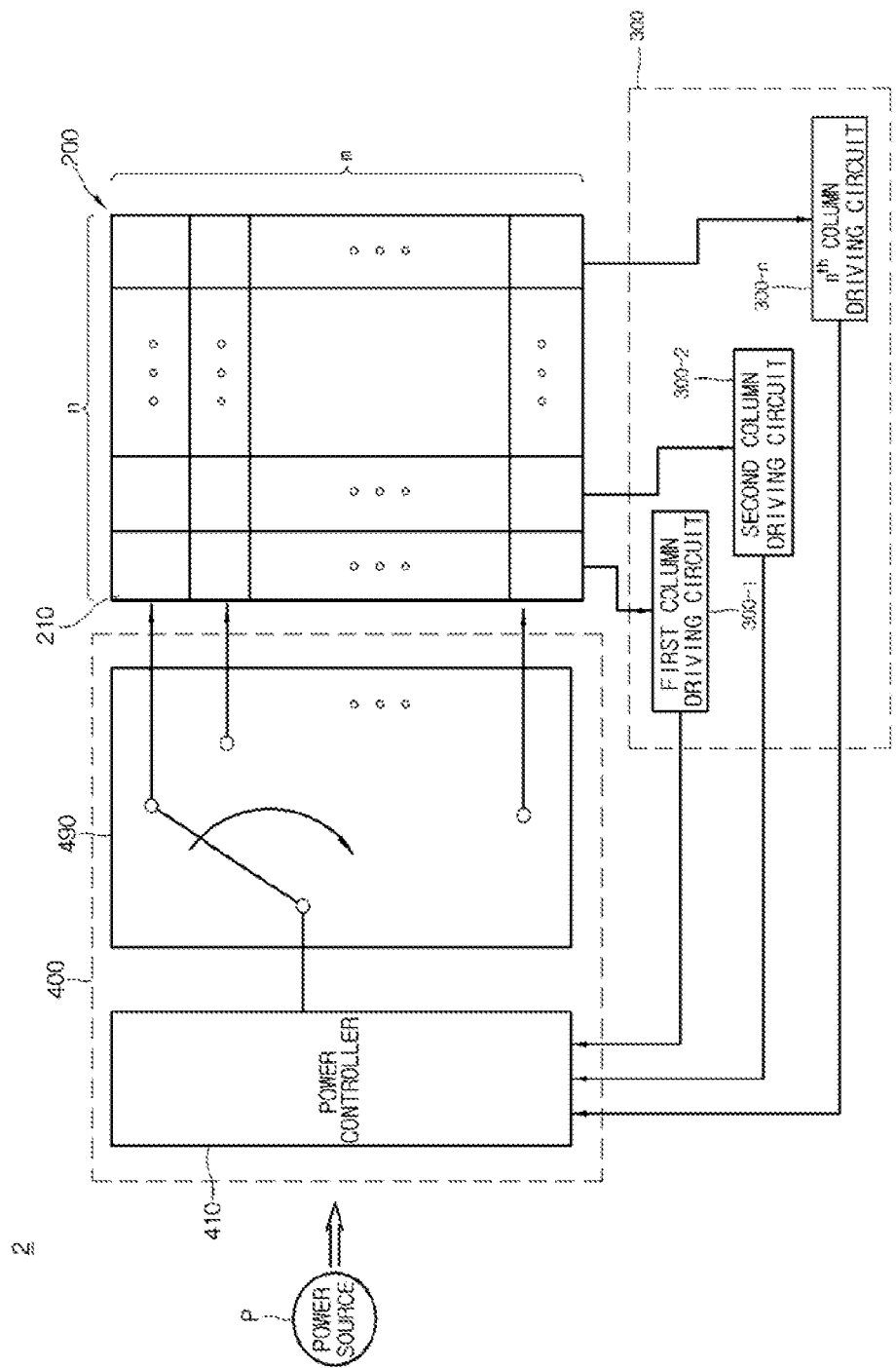
FIG. 4 is a control block diagram of a display apparatus according to an exemplary embodiment.
Figure 5:
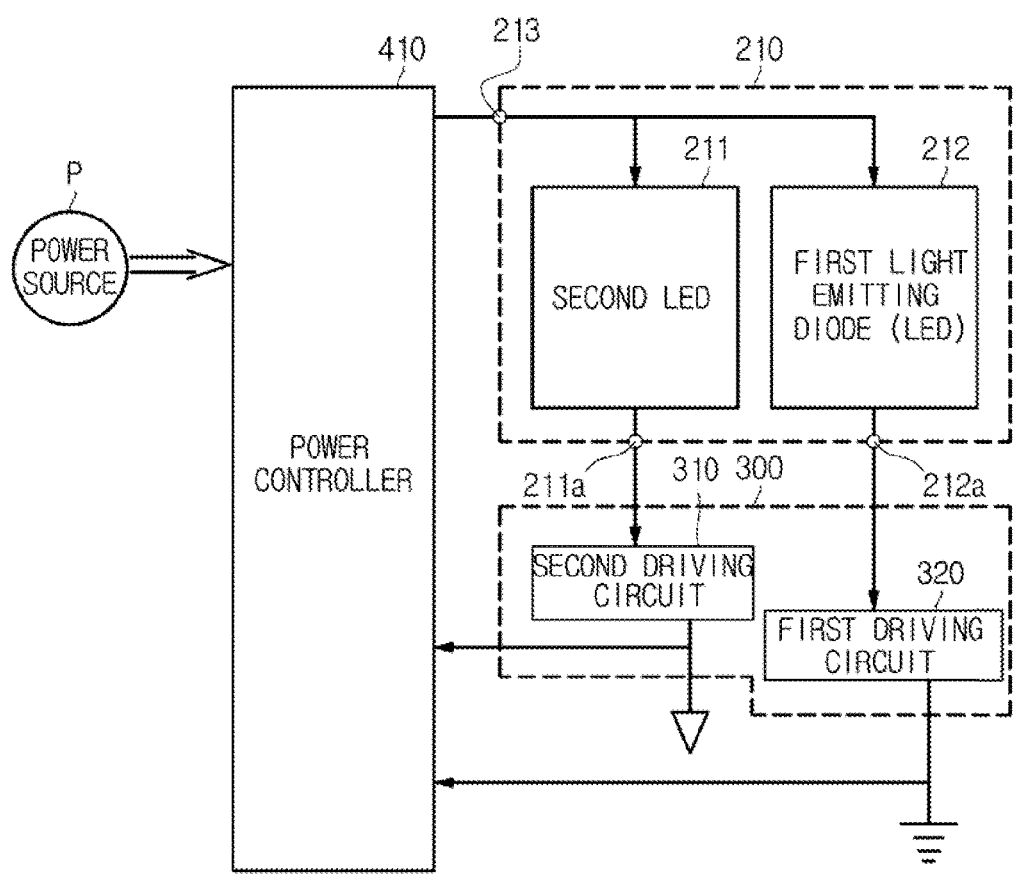
FIG. 5 is a control block diagram showing an LED module in a display panel according to an exemplary embodiment.
Figure 6:
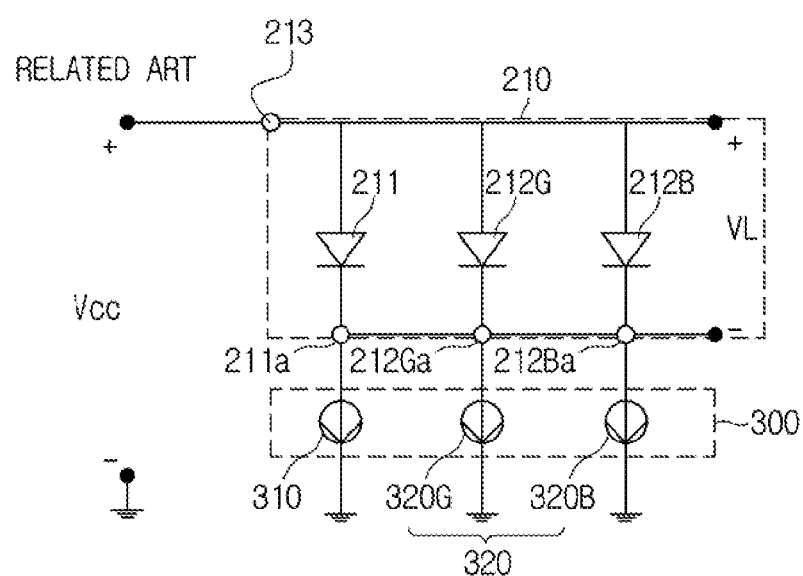
FIG. 6 is a circuit diagram illustrating a related art method of supplying a voltage to an LED module.
Figure 7A:
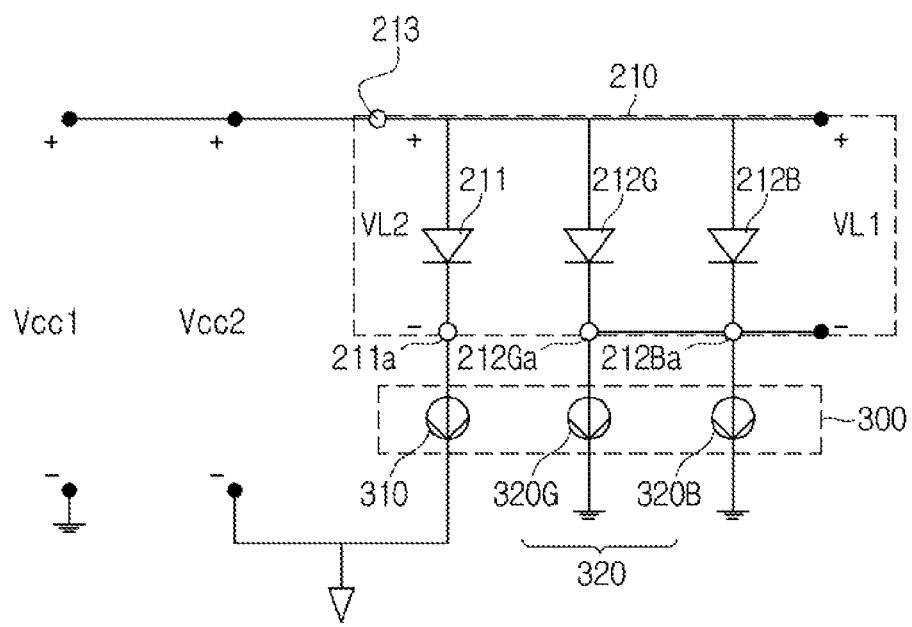
FIGS. 7A and 7B are circuit diagrams illustrating methods of supplying a voltage to an LED module according to one or more exemplary embodiments.
Figure 7B:
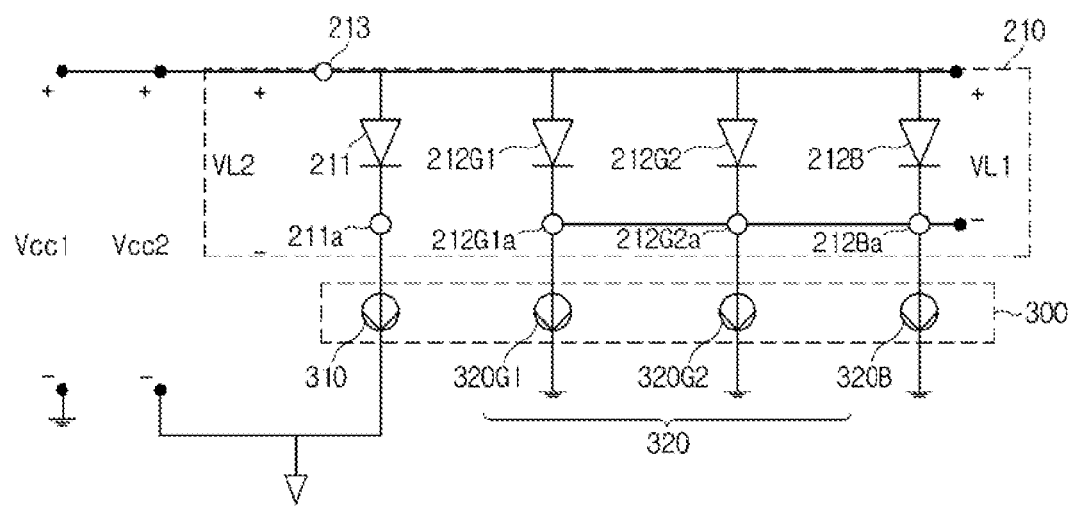

FIG. 4 is a control block diagram of a display apparatus according to an exemplary embodiment, FIG. 5 is a control block diagram showing an LED module in the display panel according to an exemplary embodiment, FIG. 6 is a circuit diagram illustrating a related art method of supplying a voltage to an LED module, and FIGS. 7A and 7B are circuit diagrams illustrating methods of supplying the voltage to the LED module according to one or more exemplary embodiments.

Referring to FIG. 4, the display apparatus 2 may include a power supply 400 which supplies voltages and a current received from an external power source P, a display panel 200 which receives driving voltages and driving current from the power supply 400 and emits light, and a driving circuit 300 which controls the driving voltages and driving current supplied to the display panel 200.

The power supply 400 may include a power controller 410 which is supplied with external power and provides the power to the display panel 200, and a scan switch 490 which connects the plurality of LED modules of the display panel 200 included in any one row or column to the power controller 410.

The power controller 410 may provide driving power for the LED modules 210 of the display panel 200 to emit light. For example, the power controller 410 may provide different voltages to each of a plurality of LEDs having different driving voltages among the plurality of LED modules 210.

The scan switch 490 may connect the plurality of LED modules 210 included in any one row or column to the power controller 410 so that the power provided by the power supply 400 is transferred to the plurality of LED modules 210 of the display panel 200 included in any one row or column.

An example in which the scan switch 490 connects the plurality of LED modules 210 included in any one row to the power controller 410 is illustrated in FIG. 4. As a result, the power may be supplied to all of the plurality of LED modules 210 included in any one row.

The scan switch 490 may change the row or column of the plurality of LED modules 210 connected to the power controller 410 at each predetermined time interval. For example, the scan switch 490 may sequentially change the row of the plurality of LED modules 210 at each predetermined time interval to connect the plurality of LED modules 210 in the changed row to the power controller 410. Hereinafter, such operation of the scan switch 490 may be referred to as scanning.

In FIG. 4, the scan switch 490 may perform the scanning on the plurality of LED modules 210 according to a predetermined scanning period. That is, the scan switch 490 may sequentially change the row of the plurality of LED modules 210 for each predetermined scanning period. For example, the scan switch 490 of FIG. 4 connects the plurality of LED modules 210 included in a first row to the power controller 410, and then the scan switch 490 may connect the plurality of LED modules 210 included in a second row to the power controller 410 after the predetermined scanning period. In the same manner, the scan switch 490 may sequentially perform the scanning on the plurality of LED modules 210 included in the first to $m^{th}$ rows.

If the image provided to the user through the display apparatus 2 has a frame rate of 15 fps to 30 fps, the scan switch 490 may perform the scanning with a scanning period smaller than a frame period of the provided image. For example, the scanning period of the scan switch 490 may be determined as a value of the frame period divided by the number of rows of the plurality of LED modules 210, or a value less than this.

The driving circuit 300 may be connected to the plurality of LED modules 210 included in the row or column to control the power supplied to the LED modules 210 included in the row or column. If the power supply 400 is connected to the plurality of LED modules 210 included in each row, the driving circuit 300 may be connected to the plurality of LED modules 210 included in each column. On the other hand, if the power supply 400 is connected to the plurality of LED modules 210 included in each column, the driving circuit 300 may be connected to the plurality of LED modules 210 included in each row.

An example in which the driving circuit 300 is connected to the plurality of LED modules 210 included in each column is illustrated in FIG. 4. Because the power is supplied to the plurality of LED modules 210 included in each row according to the scanning of the scan switch 490, the driving circuit 300 may control an amount of the supplied power according to the column in which each of the plurality of LED modules 210 included in the row in which the power is received is located.

For example, when the scan switch 490 is connected to the plurality of LED modules 210 included in the first row, a first column driving circuit 300-1 may control an amount of the power supplied to the LED module included in the first column among the LED modules included in the first row. At the same time, a second column driving circuit 300-2 may control an amount of the power supplied to the LED module included in the second column among the LED modules included in the first row. In the same manner, an $n^{th}$ column driving circuit 300-n may control an amount of the power supplied to the LED module included in the $n^{th}$ column among the LED modules included in the first row.

Further, when the scan switch 490 is connected to the plurality of LED modules 210 included in an $m^{th}$ row, the driving circuit 300 may control an amount of the power of each of the plurality of LED modules 210 included in the $m^{th}$ row in the same manner as described above.

Therefore, the amount of the power supplied to each of the plurality of LED modules 210 may be controlled, and thus the display panel 200 may provide one image through the light generated by the plurality of LED modules 210.

As described above, the power controller 410 may provide different voltages to each of the plurality of LEDs having different driving voltages among the plurality of LED modules 210.

In the control block diagram illustrated in FIG. 5, only one LED module 210 included in the display panel 200 shown in FIG. 4 is illustrated, and an example in which the LED module 210 is connected to the power controller 410 by the scan switch 490 is illustrated.

The LED module 210 may include a first LED 212 having a first driving voltage and a second LED 211 having a second driving voltage smaller than the first driving voltage. The first LED 212 may include a green LED 212G and a blue LED 212B, according to an exemplary embodiment, and the second LED 211 may include a red LED, according to an exemplary embodiment.

Further, as described above, anodes of the first LED 212 and the second LED 211 may be connected by a common anode node 213. As described above, the LED module 210 may be implemented in a common anode scheme.

Referring to FIG. 6, each of the LEDs in the LED module 210 implemented in a common anode scheme may be connected to the common anode node 213 in parallel. In this example, the same voltage is supplied to each of the plurality of LEDs. When a voltage Vcc is supplied through the common anode node 213, a voltage VL is equally applied to each of the plurality of LEDs.

When the voltage VL is a voltage of 3.5 V, which is a driving voltage of the green LED 212G and the blue LED 212B, a voltage greater than a driving voltage of 2.0 V may be applied to the red LED 211. Therefore, the red LED 211 emits electrical power corresponding to the voltage supplied with the driving voltage, or higher, as thermal energy. The LED module 210 and the driving circuit 300 are sensitive to heat such that an occurring heat generation may lead to degradation of the performance of the display apparatus 2.

Therefore, different driving voltages may be supplied to the first LED 212 and the second LED 211. The voltage applied to the common anode node 213 and cathodes 212Ga and 212Ba of the first LED 212 may be different from the voltage applied to the common anode node 213 and a cathode 211a of the second LED 211.

Referring to FIG. 7A, two supply voltages Vcc1 and Vcc2 may be supplied to the LED module 210 and the driving circuit 300. The supply voltage Vcc1 may form a loop with a green LED 212G and a blue LED 212B, which form the first LED 212, and a first driving circuit 320 connected thereto, and the supply voltage Vcc2 may form a loop with a red LED 211, which is the second LED 211, and a second driving circuit 310 connected thereto.

A common positive potential Vcc1 may be supplied to the common anode node 213, and the first driving circuit 320 connected to the cathodes 212Ga and 212Ba of the first LED 212 may be grounded with a ground voltage of 0 V. Further, the second driving circuit 310 connected to the cathode 211a of the second LED 211 may be grounded with a potential Vcc1-Vcc2. That is, while the same common positive potential may be applied to the anodes 213 of the first LED 212 and the second LED 211, different potentials may be applied to the cathodes 211a, 212Ga, and 212Ba thereof.

As a result, a driving voltage VL1 may be supplied to the first LED 212 and a driving voltage VL2, different from the driving voltage VL1, may be supplied to the second LED 211. For example, when the potential applied to the cathode 211a of the second LED 211 is positive, the driving voltage VL2 may be smaller than the driving voltage VL1.

As described above, when the driving voltages applied to the first LED 212 and the second LED 211, for example, the ground potentials applied to the cathodes 212Ga and 212Ba of the first LED 212 and the cathode 211a of the second LED 211, are different from each other, heat generated from the LED module 210 and the driving circuit 300 may be reduced because there is no unnecessary over-applied voltage.

As described above, when the potentials applied to the cathodes 212Ga and 212Ba of the first LED 212 and the cathode 211a of the second LED 211 are different from each other, the LED module 210 may be implemented as that shown in FIG. 3B. That is, the first LED 212 may include two green LEDs 212G1 and 212G2 and one blue LED 212B.

Referring to FIG. 7B, a driving voltage VL1 may be applied to a first green LED 212G1, a second green LED 212G2, and a blue LED 212B, and a driving voltage VL2 may be applied to a red LED 211. In this example, ground potentials connected to a cathode 211a of the second LED 211 and cathodes 212Ga and 212Ba of the first LED 212 are different.

For example, two supply voltages Vcc1 and Vcc2 may be supplied to the LED module 210 and the driving circuit 300. The supply voltage Vcc1 may form a loop with a first green LED 212G1, a second green LED 212G2, and a blue LED 212B, which form the first LED 212, and a first driving circuit 320 connected thereto, and the supply voltage Vcc2 may form a loop with a red LED 211, which is a second LED 212, and a second driving circuit 310 connected thereto.

In this example, a common positive potential Vcc1 may be supplied to the common anode node 213 and the first driving circuit 320 connected to cathodes 212G1a, 212G2a, and 212Ba of the first LED 212 may be grounded with a ground voltage of 0 V. Further, the second driving circuit 310 connected to a cathode 211a of the second LED 211 may be grounded with a potential of Vcc1-Vcc2.

Therefore, while the same common positive potential Vcc1 may be applied to anodes of the first LED 212 and the second LED 211, different ground potentials may be applied to the cathodes 212G1a, 212G2a, and 212Ba of the first LED 212, and the cathode 211a of the second LED 211. For example, the ground potential applied to the cathodes 212G1a, 212G2a, and 212Ba of the first LED 212 may be a first ground potential Vcc1-VL1, and the ground potential applied to the cathode 211a of the second LED 211 may be a second ground potential Vcc1-VL2.

Therefore, according to an exemplary embodiment, a driving voltage VL1 may be supplied to the first LED 212, and a driving voltage VL2 that is different from the driving voltage VL1 may be supplied to the second LED 211.

As described above, if the circuit is configured so that ground potentials applied to a ground electrode of each LED are different, different driving voltages may be applied to each LED.

As shown in FIGS. 7A and 7B, the different ground potentials are applied to the cathodes of the LEDs to which the different driving voltages are applied, and thus it may be possible to apply the different driving voltages. For example, to apply the different ground potentials to the cathodes of the plurality of LEDs, the power controller 410 may be implemented with a switching mode power supply (SMPS). Below, the power controller 410 will be described in detail with reference to FIGS. 7A and 7B.

Figure 8A:
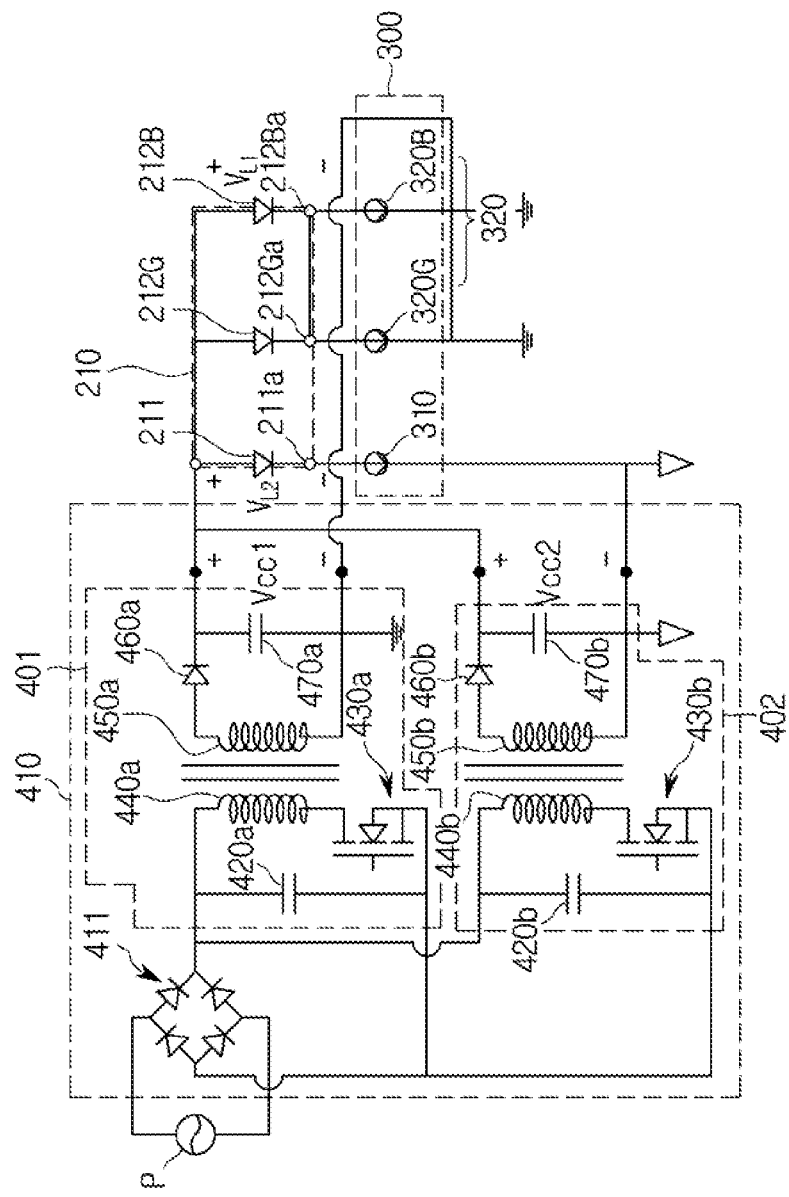
FIGS. 8A and 8B are circuit diagrams illustrating power supplies according to one or more exemplary embodiments.
Figure 8B:
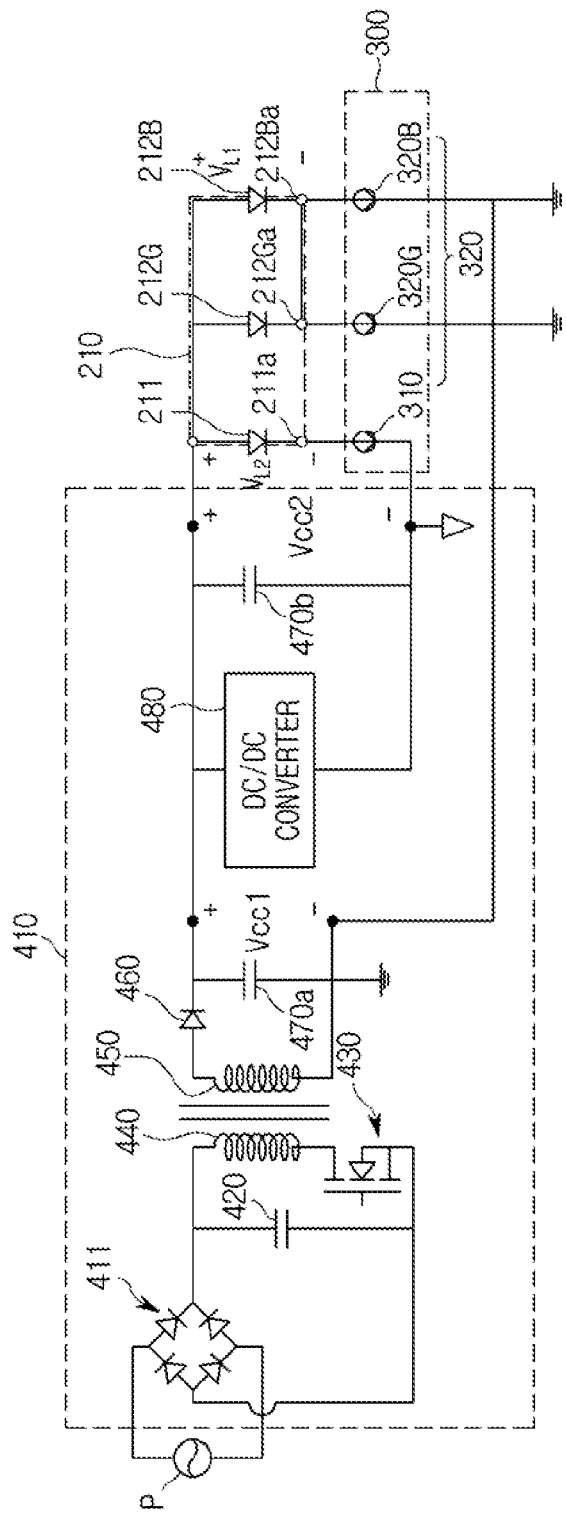

FIGS. 8A and 8B are circuit diagrams for describing the power controllers according to one or more exemplary embodiments.

The SMPS may refer to a device that converts voltages using a switch implemented with a semiconductor device such as a metal-oxide-semiconductor field-effect transistor (MOSFET). For example, when an input voltage is input, the SMPS outputs an output voltage using the switch and the information of the output voltage is used to control the switch.

The SMPS may have an efficiency and durability as compared to a linear power supply, and it may also be smaller and lighter.

The SMPS may be a non-isolation type SMPS that does not use a transformer or an isolation type SMPS that uses the transformer.

Below, the isolation type SMPS will be described with a flyback method. However, the SMPS is not limited thereto.

If the circuit is configured as shown in FIG. 7A, the voltage Vcc1 may be applied to the loop including the first LED 212 and the voltage Vcc2 may be applied to the loop including the second LED 211. Therefore, the power controller 410 may include a first power controller 401 which supplies the voltage Vcc1 and a second power controller 402 which supplies the voltage Vcc2.

Referring to FIG. 8A, the power controller 410 may include a rectifier 411, which rectifies an AC voltage externally input to a DC voltage, the first power controller 401 which receives the rectified voltage and outputs a first output voltage, and the second power controller 402 which receives the rectified voltage and outputs a second output voltage.

The rectifier 411 may be connected to an external power source P and receive a power. Further, the rectifier 411 may rectify an input voltage of the received power to a predetermined DC voltage. In this example, the rectified DC voltage may be determined by a value of a device of an internal circuit of the rectifier 411.

As shown in 8A, the rectifier 411 may be implemented with a bridge rectifier. However, the rectifier 411 is not limited thereto, and the rectifier 411 may be implemented in various ways in which a constant DC voltage is output according to an input AC voltage.

The first power controller 401 and the second power controller 402 may be installed on output terminals of the rectifier 411 in parallel.

The first power controller 401 may include first transformers implemented with a 1-1 inductor 440a and a 2-1 inductor 450a, a 1-1 capacitor 420a connected to the 1-1 inductor 440a in parallel, a first switch 430a, which controls a current applied to the 1-1 inductor 440a, a first diode 460a connected to the 2-1 inductor 450*a*, and a 2-1 capacitor 470*a* connected to the 2-1 inductor 450*a* in parallel.

When the first switch 430*a* is turned on, a voltage rectified by the rectifier 411 is applied to the 1-1 inductor 440*a* and then a current flows. Correspondingly, a voltage of an opposite direction to the 1-1 inductor 440*a* may be applied to the 2-1 inductor 450*a*. In this example, since a reverse bias is applied to the first diode 460*a* connected to the 2-1 inductor 450*a* and the first diode 460*a* is blocked, the current does not flow.

Therefore, according to an exemplary embodiment, although energy may be charged in the 1-1 capacitor 420*a* by the current which flows in the 1-1 inductor 440*a*, the current does not flow in the 2-1 inductor 450*a*, and thus the energy is not charged in the 2-1 capacitor 470*a*.

According to another exemplary embodiment, when the first switch 430*a* is turned off, a voltage opposite to that flowing when the first switch 430*a* is turned on may be applied to the 2-1 inductor 450*a*. As a result, a forward bias may be applied to the first diode 460*a* and thus energy may be charged in the 2-1 capacitor 470*a*.

Then, an output voltage of Vcc1 may be output from an output terminal of the first power controller 401.

As shown in FIG. 8A, the output voltage Vcc1 may be connected to the first LED 212 of the LED module 210 and then a first driving voltage VL1 may be supplied to the first LED 212.

In the same manner as the first power controller 401, the second power controller 402 may include second transformers implemented with a 1-2 inductor 440*b* and a 2-2 inductor 450*b*, a 1-2 capacitor 420*b* connected to the 1-2 inductor 440*b* in parallel, a second switch 430*b* which controls a current applied to the 1-2 inductor 440*b*, a second diode 460*b* connected to the 2-2 inductor 450*b*, and a 2-2 capacitor 470*b* connected to the 2-2 inductor 450*b* in parallel.

A method in which the second power controller 402 outputs a voltage may be similar to the method of the first power controller 401.

In this example, the second power controller 402 may output a voltage Vcc2 different from the output voltage Vcc1 of the first power controller 401. Referring to FIG. 8A, the output voltage Vcc2 may be connected to the second LED 211 of the LED module 210 and then may supply a second driving voltage VL2 to the second LED 211.

As described above, in order to output the different voltages, the first power controller 401 and the second power controller 402 may be grounded with different voltages. For example, a ground potential applied to a ground terminal of output terminal of the first power controller 401 may be different from a ground potential applied to a ground terminal of the output terminal of the second power controller 402.

According to an exemplary embodiment, while the first power controller 401 may be grounded with a ground voltage of 0 V, the second power controller 402 may be grounded with a voltage Vcc1-Vcc2 higher than the ground voltage. As a result, the voltage Vcc1 may be supplied to a first loop to which the first LED 212 is connected, and the voltage Vcc2 may be supplied to a second loop to which the second LED 211 is connected.

An example in which the power controller 410 outputs the first output voltage for applying the first driving voltage VL1 and the second output voltage for applying the second driving voltage VL2 is illustrated in FIG. 8A. It may also be possible that the power controller 410 outputs the first output voltage, converts the first output voltage, and then outputs the second output voltage.

Referring to FIG. 8B, a power controller 410 may include a rectifier 411 which rectifies an AC voltage externally input to a DC voltage, transformers implemented with a first inductor 440 and a second inductor 450, a first capacitor 420 connected to the first inductor 440 in parallel, a switch 430 which controls a current applied to the first inductor 440, a diode 460 connected to the second inductor 450, a 2-1 capacitor 470*a* connected to the second inductor 450 in parallel, a DC/DC converter 480 which converts a voltage output through the 2-1 capacitor 470*a*, and a 2-2 capacitor 470*b* connected to the DC/DC converter 480 in parallel.

When the switch 430 is turned on, a voltage rectified by the rectifier 411 is applied to the first inductor 440 and a current flows. Correspondingly, a voltage of an opposite direction to the first inductor 440 may be applied to the second inductor 450. In this example, since a reverse bias is applied to the diode 460 connected to the second inductor 450 and the diode 460 is blocked, the current does not flow.

Therefore, energy may be charged in the first capacitor 420 by the current which flows in the first inductor 440, but the current does not flow in the second inductor 450, and thus the energy is not charged in the 2-1 capacitor 470*a*.

When the switch 430 is turned off, a voltage opposite to that flowing when the switch 430*a* is turned on may be applied to the second inductor 450. As a result, a forward bias may be applied to the diode 460 and thus the energy may be charged in the 2-1 capacitor 470*a*.

Therefore, a first output voltage of Vcc1 may be output from the 2-1 capacitor 470*a*. As a result, the output voltage Vcc1 may be connected to the first LED 212 of the LED module 210 and then a first driving voltage VL1 may be supplied to the first LED 212.

The DC/DC converter 480 may convert the first output voltage Vcc1 which is output to a second output voltage Vcc2. For example, the DC/DC converter 480 may be implemented in various ways in which an input DC voltage is output as a converted DC voltage.

The second output voltage Vcc2 which is output as described above may be charged in the 2-2 capacitor 470*b*, and then stably supplied to a second node. As a result, the second output voltage Vcc2 may be connected to the second LED 211 of the LED module 210 and a second driving voltage VL2 may be supplied to the second LED 211.

As described above, in order to output different voltages, a terminal in which the first output voltage Vcc1 is output and a terminal in which the second output voltage Vcc2 is output may be grounded with the different voltages. Specifically, a ground potential applied to a ground terminal of an output terminal in which the first output voltage Vcc1 is output may be different from a ground potential applied to a ground terminal of an output terminal in which the second output voltage Vcc2 is output.

For example, when the first output voltage Vcc1 is connected to a first loop, the first loop may be grounded with a ground of 0 V, and on the other hand, a second loop to which the second output voltage Vcc2 is connected may be grounded with a voltage Vcc1-Vcc2 higher than the ground. As a result, the first output voltage Vcc1 may be supplied to the first loop to which the first LED 212 is connected, and the second output voltage Vcc2 may be supplied to the second loop to which the second LED 211 is connected.

Since the above-described circuit is just an embodiment of the power controller 410, the power controller 410 may be implemented in various ways in which the voltages are supplied by changing the ground potential of the LEDs having different driving voltages.

The power controller 410 may change the second output voltage Vcc2 supplied to the second loop, and thus provide a driving voltage of the second LED 211.

According to an exemplary embodiment, the power controller 410 enables an output voltage in which the first driving voltage VL1 is applied to the second LED 211 to become the second output voltage Vcc2, and then checks the current which flows in the second LED 211. Then, the power supply 400 checks a change of the current that flows in the second LED 211 while the second output voltage Vcc2 is reduced.

For example, the power supply 400 enables the first output voltage Vcc1, which applies the first driving voltage VL1, to be output from a second output terminal, and then checks the current which flows in the second LED 211. That is, the power supply 400 checks the current when the first driving voltage VL1 is applied to the second LED 211. Then, the power supply 400 checks a change of the current which flows in the second LED 211 while the second output voltage Vcc2 is reduced from the first output voltage Vcc1.

When the voltage applied to the second LED 211 is the second driving voltage VL2 or more, the current which flows in the second LED 211 has a constant value. However, when the voltage applied to the second LED 211 is smaller than the second driving voltage VL2, the current which flows in the second LED 211 may be changed.

Therefore, the voltage applied to the second LED 211 at a time point at which the current which flows in the second LED 211 is changed may be determined as the second driving voltage VL2. As described above, when the second driving voltage VL2 is determined, a second ground potential corresponding to the second driving voltage VL2 may be applied to a cathode 211a of the second LED 211.

As described above, a driving voltage may be applied to the LED having the smallest driving voltage among the plurality of LEDs included in the LED module 210, and thus a power efficiency may be increased.

Figure 9:
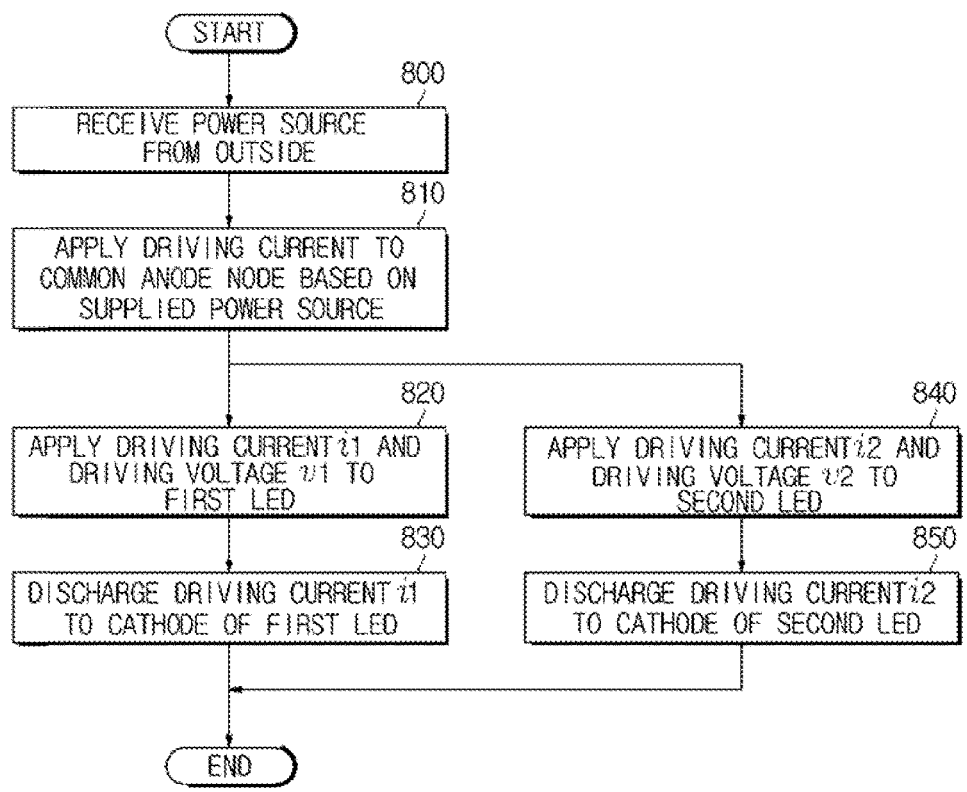
FIG. 9 is a flowchart of a method of controlling a display apparatus according to an exemplary embodiment.

FIG. 9 is a flowchart of a method of controlling a display apparatus according to an exemplary embodiment.

First, a power source may be supplied from the outside (800). The power externally supplied may be direct current or alternating current, and when AC power is supplied, an operation of rectifying the AC power to DC power may be performed.

Driving current may be applied to a common anode node 213 based on the supplied power source (810). For example, the common anode node 213 may refer to a node which connects anodes of a first LED 212 and a second LED 211 having different driving voltages.

The driving current applied to the common anode node 213 may be supplied to the first LED 212 as a first driving current i1, and then a first driving voltage VL1 may be applied to the first LED 212 (820). Therefore, a first ground potential may be applied to cathodes 212Ga and 212Ba of the first LED 212.

The first driving current i1 may be discharged through the cathodes 212Ga and 212Ba of the first LED 212 (830). Through the above described process, the first LED 212 may emit light having the corresponding wavelength. For example, if the first LED 212 is a green LED 212G, the first driving voltage VL1 may be applied to the first LED 212, and thus the first LED 212 may emit green light.

Further, a second driving current i2 of the second LED 211 among the driving currents applied to the common anode node 213 may be supplied to the second LED 211. As a result, a second driving voltage VL2 may be applied to the second LED 211 (840). Therefore, a second ground potential may be applied to a cathode 211a of the second LED 211.

The second driving current i2 may be discharged through the cathode 211a of the second LED 211 (850). Then, the second LED 211 may emit light having the corresponding wavelength. For example, if the second LED 211 is a red LED 211, the second LED 211 may emit red light.

According to an exemplary embodiment of the display apparatus and a method of controlling the same, different driving voltages can be supplied to each of a plurality of LEDs included in an LED module. Therefore, energy efficiency of the display apparatus can be increased. Because heat generated inside the display apparatus may be reduced, durability of the display apparatus can be increased and performance reliability can be increased.

Further, since the display apparatus includes LED modules in which anodes of a plurality of LEDs are connected and cathodes thereof are separated, compatibility can be increased when the display apparatus is manufactured.

Although exemplary embodiments have been shown and described, it should be appreciated by those skilled in the art that changes may be made in the exemplary embodiments without departing from the principles and spirit of the inventive concept, the scope of which is defined in the claims and their equivalents.

What is claimed is:

1. A display apparatus comprising:
a light-emitting diode (LED) component comprising a first LED, a second LED, and a third LED;
a common anode node configured to connect anodes of the first LED, the second LED, and the third LED; and
a power controller configured to supply a first driving voltage to the first LED and the third LED, and a second driving voltage to the second LED,
wherein the second driving voltage is less than the first driving voltage,
wherein the power controller is further configured to apply a first ground potential to a cathode of the first LED and the third LED, and to apply a second ground potential to a cathode of the second LED, and
wherein the first ground potential is a difference between an amount of a common positive potential applied to the common anode node and an amount of the first driving voltage, and the second ground potential is a difference between an amount of the common positive potential and an amount of the second driving voltage.

2. The display apparatus according to claim 1, wherein the power controller is further configured to apply the first driving voltage to the common anode node and the cathode of the first LED, and apply the second driving voltage to the common anode node and the cathode of the second LED.

3. The display apparatus according to claim 2, wherein the power controller is further configured to apply a potential to the cathode of the second LED that is greater than the potential of the cathode of the first LED.

4. The display apparatus according to claim 1, wherein the power controller is further configured to determine a driving voltage of the second LED based on a change of a current applied to the second LED according to a change of an output voltage.

5. The display apparatus according to claim 4, wherein the power controller is further configured to, in response to a voltage being applied to the second LED being reduced from the first driving voltage, determine the change of the current applied to the second LED to determine the driving voltage of the second LED.

6. The display apparatus according to claim 5, wherein the power controller is further configured to, in response to the current being applied to the second LED being reduced, determine the voltage applied to the second LED as the driving voltage of the second LED.

7. The display apparatus according to claim 2, wherein the power controller is further configured to divide a current supplied from a power source, and output a first output voltage for supplying the first driving voltage and a second output voltage for supplying the second driving voltage based on the divided current.

8. The display apparatus according to claim 2, wherein the power controller is further configured to output a first output voltage for applying the first driving voltage based on a current supplied from a power source, and output a second output voltage for applying the second driving voltage based on the first output voltage which is output.

9. The display apparatus according to claim 1, wherein the power controller comprises a switch configured to control a flow of an input current supplied from a power source so as to output the driving voltages supplied to the LED component.

10. A method of controlling a display apparatus in which a light-emitting diode (LED) component comprises a first LED, a second LED, and a third LED, the method comprising:
  applying a common positive potential to a common anode node which connects an anode of the first LED and an anode of the third LED to an anode of the second LED;
  applying a first ground potential to a cathode of the first LED and a cathode of the third LED so that a first driving voltage is applied to the first LED and the third LED; and
  applying a second ground potential to a cathode of the second LED so that a second driving voltage is applied to the second LED,
  wherein the second driving voltage is less than the first driving voltage, and
  wherein the first ground potential is a difference between an amount of the common positive potential and an amount of the first driving voltage, and the second ground potential is a difference between the amount of the common positive potential and an amount of the second driving voltage.

11. The method according to claim 10, wherein the applying the second ground potential includes applying the second ground potential that is greater than the first ground potential.

12. The method according to claim 10, further comprising changing a voltage applied to the second LED and determining the second driving voltage.

13. The method according to claim 12, wherein the determining the second driving voltage comprises:
  changing the voltage applied to the second LED;
  determining a current which flows in the second LED according to the applied voltage which is changed; and
  determining the second driving voltage based on the determined current.

14. The method according to claim 13, wherein the changing the voltage applied to the second LED includes reducing the voltage applied to the second LED from the first driving voltage.

15. The method according to claim 14, wherein the determining the second driving voltage based on the determined current includes determining the applied voltage at a time at which the current applied to the second LED is reduced, as a driving voltage of the second LED.

16. A method of controlling a display apparatus, the method comprising:
  displaying an image by providing a plurality of voltages to a light-emitting diode (LED) component, wherein the LED component comprises a first LED, a second LED, and a third LED;
  applying a first potential to a common anode node of the first LED, the second LED, and the third LED, and
  applying a first ground potential to a cathode of the first LED and a cathode of the third LED so that a first driving voltage is applied to the first LED and the third LED, and applying a second ground potential to a cathode of the second LED so that a second driving voltage is applied to the second LED,
  wherein the second driving voltage which crosses the second LED is less than the first driving voltage which crosses the first LED or the third LED, and
  wherein the first ground potential is a difference between an amount of the first potential applied to the common anode node and an amount of the first driving voltage, and the second ground potential is a difference between the amount of the first potential applied to the common anode node and an amount of the second driving voltage.

17. The method of claim 16, wherein the applying the first potential comprises rectifying an alternating current (AC) voltage externally input to a direct current (DC) voltage.

18. The method of claim 16, wherein the applying the first potential comprises applying a driving current to the common anode node based on a power supplied by a power source.

19. The method of claim 16, further comprising a first power controller and a second power controller for supplying the first ground potential and the second ground potential, respectively.

* * * * *